(12) United States Patent
Morovic et al.

(10) Patent No.: US 11,310,393 B2
(45) Date of Patent: Apr. 19, 2022

(54) CLUSTERING COLORS FOR HALFTONING

(71) Applicant: Hewlett-Packard Development Company, L.P., Spring, TX (US)

(72) Inventors: Peter Morovic, Sant Cugat del Valles (ES); Jan Morovic, London (GB); Sergio Etchebehere Juan, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/051,415

(22) PCT Filed: Jul. 18, 2018

(86) PCT No.: PCT/US2018/042660
§ 371 (c)(1),
(2) Date: Oct. 28, 2020

(87) PCT Pub. No.: WO2020/018086
PCT Pub. Date: Jan. 23, 2020

(65) Prior Publication Data
US 2021/0243334 A1 Aug. 5, 2021

(51) Int. Cl.
*H04N 1/52* (2006.01)
*H04N 1/00* (2006.01)
(Continued)

(52) U.S. Cl.
CPC ........... *H04N 1/52* (2013.01); *H04N 1/00023* (2013.01); *H04N 1/00034* (2013.01);
(Continued)

(58) Field of Classification Search
CPC combination set(s) only.
See application file for complete search history.

(56) References Cited

U.S. PATENT DOCUMENTS 6,844,941 B1   1/2005  Sharma et al.
7,136,189 B2  11/2006  Sharma et al.
(Continued)

FOREIGN PATENT DOCUMENTS

WO   WO-2017182093 A1   10/2017

OTHER PUBLICATIONS

International Search Report and Written Opinion dated Mar. 28, 2019, PCT Patent Application No. PCT/US2018/042660, filed Jul. 18, 2018, Federal Institute of Industrial Property, Moscow, Russia, 9 pages.

(Continued)

*Primary Examiner* — Barbara D Reinier
(74) *Attorney, Agent, or Firm* — HP Inc. Patent Department

(57) ABSTRACT

Certain examples described herein relate to a color processing apparatus and a method of generating configuration data for a color rendering device. The color rendering device operates based on color state instructions indicating output color states for portions of a rendered output. Render data may be generated by applying a halftone matrix and color data may indicate probability values for the output color states for input image areas corresponding to the portions of the rendered output. In described examples, configuration data defines an order of output color states for application of the halftone matrix. In the order, the output color states are grouped within the data based on color properties of a rendered output and an order within the clusters is based on colorant composition.

16 Claims, 3 Drawing Sheets

(51) Int. Cl.
*H04N 1/60* (2006.01)
*H04N 1/405* (2006.01)

(52) U.S. Cl.
CPC .......... *H04N 1/405* (2013.01); *H04N 1/6002* (2013.01); *H04N 1/6005* (2013.01); *H04N 1/6008* (2013.01); *H04N 1/6016* (2013.01); *H04N 1/6033* (2013.01); *H04N 1/6058* (2013.01)

(56) References Cited

U.S. PATENT DOCUMENTS

| | | |
|---|---|---|
| 7,486,413 B2 | 2/2009 | Eliav et al. |
| 8,228,559 B2 | 7/2012 | Parmar et al. |
| 2011/0096344 A1* | 4/2011 | Morovic .............. H04N 1/6033 358/1.9 |
| 2017/0324884 A1 | 11/2017 | Morovic |
| 2018/0034998 A1 | 2/2018 | Pancik |

OTHER PUBLICATIONS

Peter Morovic et al., "PARAWACS color halftoning with a single selector matrix", Nov. 18, 2016, Researchgate, 7 pages.

Wanling Jiang et al., "Color halftoning based on Neugebauer Primary Area Coverage", 2017, Ingentaconnect, 12 pages.

Weijuan Xi, et al., "Color Halftoning Based on Multi-Stage, Multi-Pass, Clustered DBS", 2017, Researchgate, 11 pages.

\* cited by examiner

310 w, Y, YY, YYYY, m, c, mY, cY, mYY, mYYYY,
cYY, cc, mm, cYYYY, mmY, C, M, MY, R, mM, N,
cC, CY, mmmm, CYY, cccc, mmM, MM, CC, ccC,
MMY, YN, mMM, RR, cCC, YYN, mN, Cm, YYYYN,
cM, MMMMY, CCY, MMMM, CCYY, MmN, cR, NN,
CCm, CN, CCCC, MN, RRRR, RN, CYN, cMM, CM,
CCCCY, mmmmN, cRR, k, CCN, MMN, CCCCm,
cMMMM, CCM, RRN, Yk, CMM, ck, cRRRR,
MMMMN, YYk, YYYYk, CCCCN, cck, Mk, Ck,
Nk, RRRRN, Rk, NNNN, MMk, CCk, ccck, RRk,
NNk, kk, MMMMk, CCCCk, RRRRk, Nkk, kkkk

FIG. 3A

320 w, Y, YY, YYYY, mYYYY, mYY, mY, m, mm,
M, MY, mmY, cY, c, cc, ccC, cC,
C, CY, CYY, cYY, cYYYY, CCYY, CCY, CC, cCC,
Cm, mM, mmM, mMM, MM, MMMM, MMY,
cM, cccc, cR, R, RR, RRRR, N, NN,
YN, YYN, YYYYN, mN, mmN, mmmm,
mmmmN, MN, MMN, cMM, CMM, CM,
CCM, CCm, CCCCm, CCCC, CCCCY, CCN, CN,
CYN, RN, RRN, cRR, cRRRR, ck, k, Yk, YYk,
cck, cMMMM, MMMMY, MMMMN, MMMMk,
MMk, Mk, kk, Nkk, Nk, NNk, NNNN, Ck,
CCk, CCCCk, CCCCN, Rk, RRk, RRRRk, RRRRN,
YYYYk, ccck, kkkk

FIG. 3B

CLUSTERING COLORS FOR HALFTONING

CLAIM FOR PRIORITY

The present application is a national stage filing under 35 U.S.C 371 of PCT application number PCT/US2018/042660, having an international filing date of Jul. 18, 2018, the disclosure of which is hereby incorporated by reference in its entirety.

BACKGROUND

Color rendering devices, such as printing devices, typically operate to generate a rendered output using a number of available colorants. For example, a printing device may be configured to deposit discrete amounts of a set of colorants such as Cyan, Magenta, Yellow and Black (CMYK) inks. In order to render an image, such as a two-dimensional photo or a portion of a three-dimensional model, image data is converted into instructions for the color rendering device by a color processing pipeline. It is desired that the colors within the rendered output match the original coloring of the image. When rendering a color image, the color processing pipeline is designed to address a number of technical considerations: how to adjust image data based on the capabilities of a given color rendering device (known as color management); how to combine available colorants to match renderable colors (known as color separation); and how color separation choices are to be translated into discrete colorant amount placement in the final rendered output (known as halftoning).

BRIEF DESCRIPTION OF THE DRAWINGS

Various features of the present disclosure will be apparent from the detailed description which follows, taken in conjunction with the accompanying drawings, which together illustrate, features of certain examples, and wherein:

FIG. 3A is a schematic illustration showing configuration data for a color rendering device according to a comparative example;

FIG. 3B is a schematic illustration showing configuration data for a color rendering device according to an example;

DETAILED DESCRIPTION

Figure 1:
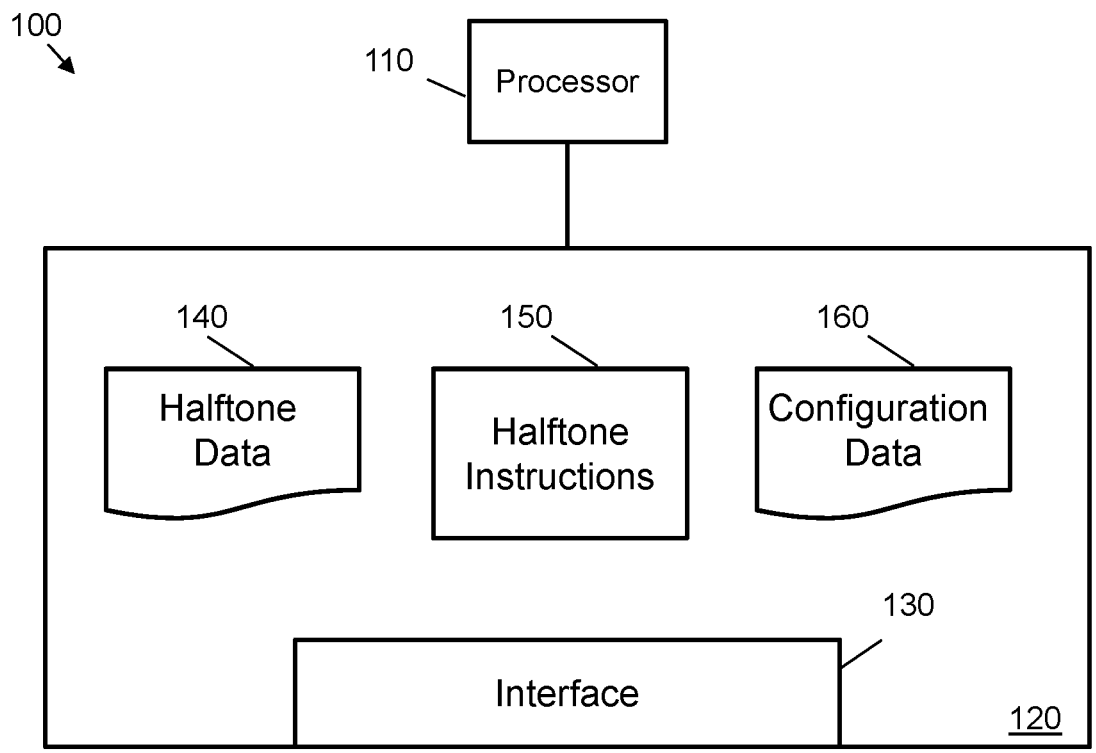
FIG. 1 is a schematic illustration of a color processing apparatus according to an example.

Certain examples described herein relate to halftoning. Halftoning is the process by which a continuous tone image is approximated via the rendering of discrete quantities of available colorants. For example, a printed image may appear continuous from a distance, e.g. colors "blend" into each other. However, when inspected at close range, the printed image is found to be constructed from layers of colorant with discrete deposit patterns. Comparative colorant channel approaches to halftoning involve a color separation stage that specifies colorant amounts to match colors within the image to be rendered; e.g. in a printing system, it determines how much of each of the available inks are to be used for printing a given color. For example, a given output color in a CMYK printer may be set as 30% Cyan, 30% Magenta, 40% Yellow and 0% Black (e.g. in a four element vector where each element corresponds to an available colorant). Input colors in an image to be rendered are mapped to such output colors. Following this, when using colorant channel approaches, halftoning involves making a spatial choice as to where to apply each colorant in turn, given the colorant amounts from the color separation stage. For a printing device, this may comprise determining a drop pattern for each ink, wherein the drop patterns for the set of inks are layered together and printed.

These comparative colorant channel approaches can present challenges. For example, since halftoning for these approaches involves considering colorant amounts on a per colorant basis, there may be unwanted interactions between halftone patterns that lead to image artifacts. A different approach to halftoning involves modifying the color separation stage such that it no longer specifies colorant amounts, but instead considers output color states for a color rendering device. For example, a printing device with three colorants—CMY—that is able to print single drops may be seen to have eight color output states: white or blank substrate (i.e. no drops of any colorant), C, M, Y, CM (e.g. one drop of Magenta overprinted on one drop of Cyan), CY, MY, CMY (e.g. one drop of each colorant, overprinted). An output of a color rendering device may then be considered as a set of addressable output areas of a substrate, such as print-resolution pixels, where each output area may have one of the color output states. The color separation stage of the present approaches may then consider color data as probability values for the output color states for input image areas corresponding to the portions of the rendered output. For example, an image pixel may have an output color state probability vector, with elements corresponding to each of the output color states (e.g. [W, C, M, Y, CM, CY, MY, CMY] for a CMY printer). The output color state probability vector is also known as an area coverage representation, as it indicates relative area coverages for each renderable output color state of a color rendering device. As this vector is a probability vector, the elements of the vector sum to unity (e.g. 1 or 100%).

In certain examples, the color output states of the color rendering device are referred to as Neugebauer Primaries (NPs), with reference to the reflectance equations of Hans Neugebauer, which modeled a reflectance of a printed output by considering a weighted combination of each ink combination. In these examples, the probability values for the output color states may be considered as Neugebauer Primary area coverages (NPacs), which may be implemented in the form of NPac vectors. A color processing system that uses NPacs may be referred to as a Halftone Area Neugebauer Separation (HANS) configuration.

When working with color data that indicates probability values for output color states of a color rendering device, the halftoning process becomes a stage in which, for a given portion of a rendered output, a particular output color state is selected based on the probability values. This may be seen as a form of sampling. Different methods may be used to perform this selection. A first method is error diffusion. This involves selecting an output color state for a first portion of output, e.g. by taking the maximum value in a color state probability vector as a maximum likelihood estimator, then diffusing an error based on this selection to neighboring portions, e.g. if C=60% and MY=40% and C is selected as the output color state, then the value of MY becomes an error that is distributed to neighboring pixels. This error modifies the probability values, which in turn influences the output color state selected for neighboring portions.

A second method involves using a halftone matrix to select, for a given portion of a rendered output, output color states based on a comparison of probability values and threshold values. One particular form of this second method is known as PArallel RAndom Weighted Area Coverage Selection (PARAWACS). For example, to select output color states for an area of a printed image (e.g. a square of color) having a particular color state probability vector (e.g. [W=80%, M=10%, CY=10%]—where other elements have values of 0%), threshold values may be obtained for pixels within the area by generating a set of uniformly distributed random numbers (e.g. if the square is 128 pixels by 128 pixels, a corresponding halftone matrix may have 16384 elements with random values between 0 and 1). A cumulative probability distribution may be generated from the color state probability vector, e.g. [W=80%, M=90%, CY=100%]. A comparison is then made for each pixel of the square, e.g. corresponding to each of a set of print resolution pixels. For a given output pixel, the substrate is left blank (W is selected) if the random value associated with that pixel is between 0 and 0.8, a drop of Magenta is deposited for that pixel (M is selected) if the random value is between 0.8 and 0.9, and a drop of Yellow is deposited on top of a drop of Cyan (CY is selected) for that pixel if the random value is between 0.9 and 1. These output color states may be selected in parallel, leading to an efficient and quick halftoning operation.

One benefit of the second method is that the halftone matrix may be selected to effect a particular spatial distribution. In one case, different forms of spatial patterns may be used by controlling the distribution of the threshold values in the halftone matrix. For example, rather than uniformly distributed random numbers (e.g. white noise), the spatial frequency of threshold values may be controlled so as to generate different noise types. A blue or green noise pattern may be generated by adding constraints to the random number generate in the (spatial) frequency domain, e.g. blue noise patterns may have weaker low-frequency energy, and green noise patterns may constraint the midband frequencies. Visually, blue or green noise patterns appear with spatial groupings of threshold values (e.g. resulting in small blobs of color in a halftone output). Another benefit of the second method of halftoning is that the spatial distribution resulting from the halftone operation may be previewed by plotting the threshold values of the halftone matrix (e.g. as a greyscale image, where the range of 0 to 1 may be quantized to integer values between 0 and 255).

When using the second method, an order of the output color states affects an output of the halftoning. For example, if there is some spatial grouping in the halftone matrix, such as when using a green noise pattern, a first order of output color states, e.g. W, M, CY in the previous example, may produce a different appearance to a second order of output states, e.g. to a reversed order such as CY, M, W, for a common set of probability values (e.g. W=80%, M=10% and CY=10%). For example, small clustered areas in the halftone matrix may result in clusters of color surrounded by white with the first order, and clusters of white surrounded by color in the second order. In one configuration, output color states may be ordered by a color property value. For example, output color states may be ordered by a measured lightness for each of the output color states. The color property value may be based on a measured spectral or colorimetric value, e.g. a measurement of a rendered output using a spectrophotometer or colorimeter, where colorimetry refers to a lower dimension color representation such as the International Commission on Illumination (CIE) XYZ or L*a*b* color value. In one case, a lightness value may be measured directly and/or derived from a measured spectral or colorimetric value.

Certain examples described herein provide an approach to color rendering that uses a custom ordering of output color states. This custom ordering may help reduce image artifacts in a rendered output of a color rendering device and improve image quality. The custom ordering may also help improve an efficiency of a halftoning operation. Certain examples described herein may provide improvements for color rendering devices as a number of available colorants and/or deposit states increases.

FIG. 1 shows an example of a color processing apparatus 100. The color processing apparatus 100 may comprise an independent device, such as a computer, or may comprise part of a color rendering device, such as a printer. The color processing apparatus 100 in FIG. 1 comprises at least one processor 110, storage media 120 and an interface 130. The at least one processor 110 may comprise one or more processors, where each processor may have one or more cores. The at least one processor 110 may form part of an integrated control circuit, such as an Application Specific Integrated Circuit (ASIC) or Field Programmable Gate Array (FPGA). The storage media 120 may comprise data storage electronics such as registers, memory and/or storage devices. Registers and memory may comprise random access memory (RAM) and/or read-only memory (ROM), where in the latter case, the memory may comprise an electrically erasable programmable read-only memory (EEPROM). The storage media 120 may comprise multiple independent storage media, or may comprise different portions of a common storage medium, e.g. different portions of a memory, solid state storage device and/or hard disk drive. The interface 130 enables the color processing apparatus 100 to be couplable to a color rendering device. The interface 130 may comprise an interface for an internal control bus, or an interface for an external communications medium, such as a Universal Serial Bus connection or a network coupling. The interface 130 enables the color processing apparatus 100 to communicate render data to a color rendering device. The render data may comprise, for example, print data to print an image.

In FIG. 1, the storage media 120 is communicatively coupled to the at least one processor 110 and is arranged to store halftone data 140, halftone instructions 150 and configuration data 160.

The halftone data 140 defines a halftone matrix. For example, the halftone data may comprise values for a halftone matrix of a particular resolution. The halftone matrix may have a resolution that is the same as, or different from, an image to be rendered. Resolution in this case may refer to a particular width in pixels and a particular height in pixels. In the latter case, elements of the halftone matrix may be mapped to corresponding portions of an input and/or output image, e.g. based on down or up sampling and/or spatial transformations. In one case, a halftone matrix may be constructed for a particular size and/or type of input image based on halftone data 140. Values of a halftone matrix may be defined according to a particular number format, e.g. integer values having a predefined number of bits. In one case, values may be defined as 8, 16, 32 or 64-bit integer values.

The halftone instructions 150 comprise computer program code to instruct the at least one processor 110 to halftone color data for a rendered output using the halftone matrix and to output render data. The render data comprises instructions that enable a color rendering device, such as a printer, to generate the rendered output. For example, the render data may comprise deposit instructions indicating a number of drops for each of a set of inks available to a color printer. The color printer may comprise an inkjet printer that is adapted to eject inks from printer pens installed within the printer. Each printer pen may be filled with a particular color of ink. The relative location of each printer pen with respect to a print medium may be controlled by the color rendering device so as to deposit ink in areas of the print medium that correspond to print-resolution pixels.

In this example, the color data for the rendered output indicates probability values for output color states of the color rendering device. For example, the probability values may be defined as an array of length n, where n equals a number of output color states that are available to render the output. The output color states that are available to the color rendering device may depend on a configuration of the device, e.g. a number of printheads that are installed, and/or a number of drop levels that are made available. The output color states may comprise a blank substrate state (e.g. no deposit of colorant), single drop amounts of colorant, and combinations (e.g. overprints) of different colorants. The number of drop levels may depend on, for example, limits for a maximum amount of ink that is depositable, e.g. based on a print medium type and/or size of a print-resolution pixel. In one case, the probability values for the output color states may comprise an NPac vector, wherein each output color state comprises an available Neugebauer Primary. The set of available output color states may change if a configuration for the color rendering device is altered. A change in the configuration of the color rendering device may be communicated to the color processing apparatus 100 via the interface 130.

In one case, the color data comprises probability values for output color states for each of a set of input image areas corresponding to the portions of the rendered output. For example, the portion of the rendered output may comprise print-resolution pixels and the input image areas may comprise image-resolution pixels. The may be a one-to-one, many-to-one, or one-to-many mapping between image-resolution and print-resolution pixels, e.g. depending on a number of dots or drops of ink that may be deposited along a line by the color rendering device and an image-resolution of an image to be rendered. A halftoning operation, e.g. as implemented by halftone instructions 150, may be configured to select a particular (discrete) output color state for each print-resolution pixel. Mapping between pixels may be performed using up or down sampling techniques. In certain cases, a print-resolution may comprise more pixels than an image-resolution.

The color data for an image to be rendered may be received, obtained and/or generated by the color processing apparatus 100. For example, in one case, the color data may be received from an external device via the interface 130, or a separate interface. The external device may comprise a computing device that generates the color data when submitting a print job. In other cases, the color processing apparatus 100 may receive an image to be printed, and map color values in a first color space such as a standard Red, Green, Blue (sRGB) or XYZ color space, to values in a second color space that uses an area coverage representation, e.g. an NPac color space. Color mapping may be performed by way of a look-up table, with input nodes in the first color space that are mapped to output nodes in the second color space; e.g. a row of the table may comprise a pair of input and output nodes, wherein mappings for values between the nodes are performed via interpolation.

Returning to FIG. 1, the storage media 120 also stores configuration data 160 defining an order of output color states for application of the halftone matrix. If the output color states comprise Neugebauer Primaries this may comprise an ordered list of NPs. In the present examples, the output color states are grouped within the configuration data 160 based on clusters of output color states. The clusters are defined based on color properties of a rendered output generated by the color rendering device. For example, the clusters may be defined based on color property values associated with each output color state. The clusters may be defined based on measured lightness values of the output color states, e.g. using groups within a lightness value range, a k-means clustering function or the like. The measured lightness value may comprise an L* value in the L*a*b* color space. In the present case, the order within the clusters is based on colorant composition. For example, the order within each cluster may be ordered based on the colorants that form part of each output color state.

The order of output color states derived from the configuration data determines how the halftone matrix derived from the halftone data 140 is applied when the at least one processor 110 executes the halftone instructions 150. For example, in one case, the halftone matrix comprises threshold values and the halftone instructions 150 is to instruct the at least one processor 110 to generate sampling data indicative of a cumulative probability distribution from vectors of the color data with the output color states. In this case, the elements of the vectors, which correspond to the output color states, are arranged in the order indicated by the configuration data. The halftone instructions 150 then cause the at least one processor 110 to halftone the color data by selecting an output color state based on a comparison of a threshold value from the halftone matrix and ordered elements of the cumulative probability distribution.

An example may be illustrative. Consider a simplified case of a three—CMY—ink printer, where the printer can deposit one drop of each ink. There may be $m^k$ output color states, where m equals the number of printable drops and k equals the number of available inks. In this case, there may be $2^3=8$ output color states, where m=2, as there are two drop configurations (drop or no-drop), and k=3, as there are three inks. In this context, an image may be received comprising an area of a single color. This color may be defined using an sRGB value. The color processing apparatus may map this sRGB value for a pixel in the area to an NPac value using a color mapping (e.g. a pre-configured look-up table). An example NPac value may be [W=80%, C=0%, M=10%, Y=0%, CM=0%, CY=10%, MY=0%, CMY=0%]. An output state is then selected using a threshold value from the halftone matrix. The halftone matrix may have different threshold values corresponding to different pixels in the area of the image. A pixel may be considered that has a corresponding threshold value of 85 in the halftone matrix. In one case, a selection is made by converting the NPac value into a cumulative probability distribution (e.g. a "cumulative NPac"). How this conversion is performed depends on the order derived from the configuration data 160. If the order is specified as [W, C, M, Y, CM, CY, MY, CMK] then a cumulative probability distribution may be computed by ignoring the 0 values and successively summing the elements in that order, e.g. resulting in [W=80%, M=90%, CY=100%]. However, if the order is specified as [W, Y, C, CY, CM, M, MY, CMK] then this will result in a cumulative NPac of [W=80%, CY=90%, M=100%]. In this second order, the output color states are arranged in an order based on ink composition (e.g. in one group the states are ordered based on the ink-dominant C and M compositions, i.e. the first listed ink component of the state). If the threshold value is 85, using the first order this will result in a drop of Magenta (M) being selected as the output state for the pixel (as the value 85 falls within the range 80-90). If the second order is used, this results in a drop of Cyan with an overprint of a drop of Yellow (CY) being selected as the output state for the pixel (the value 85 still falls within the range 80-90 but with the second order this is associated with CY rather than M). Hence, the configuration data 160 influences the appearance of the rendered output.

The above example is simplified for ease of explanation. A production printing device may have, for example, nine different inks and deposit up to three drops per print-resolution pixel. In this case, there may be $4^9$=262,144 different output color states (there are four drop states: no drop or 1 to 3 drops, and 9 inks). Hence, each set of probability values may comprise a vector of a high dimensionality (e.g. of length 262144). In certain cases, printing devices may also be able to deposit different drop sizes, e.g. each drop may comprise one of Q different quantities of ink. The number of possible orders of output color states may thus be extremely large, with color rendering devices having millions of possible output color states for a print resolution pixel. The present examples help to manage this complexity and provide rendered output that has an improved image quality over lightness ordering alone.

Figure 2:
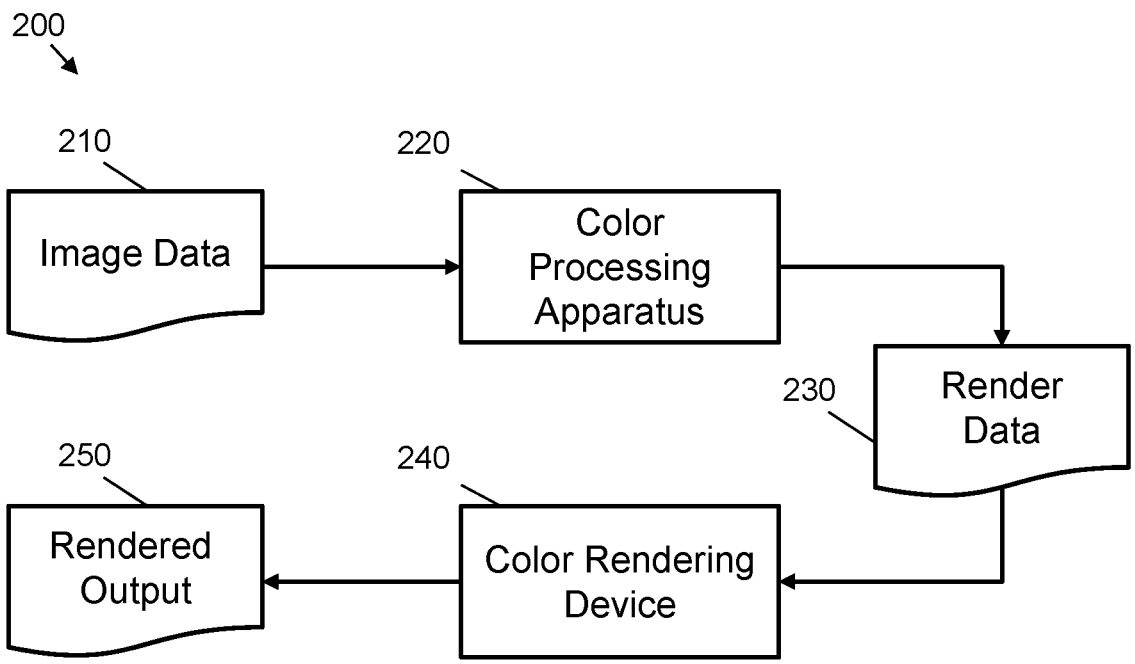
FIG. 2 is a schematic illustration of a color processing pipeline according to an example.

FIG. 2 shows an example of a color processing apparatus in use within a color processing pipeline 200. Color processing pipelines may vary at least based on available equipment and chosen configurations, and as such FIG. 2 is a schematic example. In FIG. 2, image data 210 is received by a color processing apparatus 220. The image data 210 may comprise part of a print job submitted by a local or networked computing device. The computing device may be a desktop, laptop and/or mobile computer, or may comprise a print server. The image data 210 may comprise color values for an image to be printed having an image-resolution, e.g. having a plurality of pixels with a width of x pixels and a height of y pixels. The image data 210 may comprise data for a plurality of images, e.g. a batch of print jobs and/or slices of a three-dimensional object to be printed. The image data 210 may comprise color values in a first color space such as an RGB-based space or a device independent color space. In one case, the image data 210 may already be converted into color data in a probability space such as NPac data. In other cases, this may be performed by the color processing apparatus 220.

In FIG. 2, the color processing apparatus 220 is arranged to convert the image data 210 into render data 230 for a color rendering device 240. The render data 230 may comprise print instructions. The render data 230 includes color state instructions. These indicate output color states, which may be discrete combinations of renderable colorants, for portions of a rendered output, e.g. for each of a set of print-resolution pixels. The color rendering device 240 uses the render data 230 to generate a rendered output 250. Rendered output 250 may comprise a printed image on a print medium. Many different types of print medium may be used including, paper, corrugated media, polymer sheets and films, vinyl, textiles and the like. Rendered output 250 may be subject to pre- and/or post-processing depending on the configuration of a color rendering system. For example, rendered output may be treated, primed, fixed, dried, laminated, cut, and stacked.

In certain cases, at least the color processing apparatus 220 forms part of a multi-dimensional (e.g. 2D or 3D) color printer. For a 3D printer case, the render data 230 may relate to slices of an object to be produced, e.g. z-slices, the object having a particular color that is rendered by the color rendering device 240. For example, a 3D printer may deposit build materials of different colors, and/or may deposit liquid agents comprising colorant that color a build material, such as a white powdered polymer.

FIGS. 3A and 3B show examples of data that stores an output color state order. FIG. 3A shows data 310 where the order is based on a lightness value of the output color state. FIG. 3B shows data 320 where the order is based on lightness clusters, wherein within the clusters the output color states are ordered based on a colorant combination. The examples in FIGS. 3A and 3B correspond to a color rendering device with a white or blank substrate state "w", and inks: [Y, m, c, C, M, R, N, k], e.g., respectively, a large drop of Yellow ink, a small drop of Magenta ink (often named "magenta" with a small "m"), a small drop of Cyan ink ("cyan" with a small "c"), a large drop of Cyan ink, a drop of Magenta ink, a drop of Red ink, a drop of Gray ink and a small drop of Black ink ("black" with a small "k"), where the "large" and normal drops of ink may be of a first size (e.g. a first amount in pico-litres) and the "small" drops of ink may be of a second size (e.g. a second amount in pico-litres), where the first size is greater than the second size. In certain cases, different inks may use a different large, small or normal drop size; e.g. a drop size for M may differ from a drop size for Y. The output color states comprise single drop and multiple drop combinations of these inks.

In the data 310 of FIG. 3A, five example low-drop-weight Magenta output color states are shown in bold, e.g. output color states that have one or two drops of light magenta (i.e. small "m"). In a lightness ordering, e.g. based on measured L* values of each of the output color states as printed by a color rendering device, it may be seen that the bold output color states are spaced out, with certain other non-light-magenta color states in between (e.g. states "mY" and "mYY" are separated by state "cY"). When the same output color states are clustered based on lightness value, e.g. values are binned based on a distance to an average or preset lightness value, and then ordered based on ink composition, as is shown in the data 310 of FIG. 3B, the five example low-drop-weight Magenta output color states are ordered consecutively (e.g. "mYYYY, mYY, mY, m, mm").

The ordering of color output states as taught by the present examples, e.g. as shown by the order in the data 320 of FIG. 3B, maintains a form of lightness ordering but groups certain same-colorant (e.g. same-ink) output color states together without introducing large discontinuities in lightness value. Using a comparative lightness ordering without clusters and without considering colorant composition results in an order where consecutive output color states are more likely to be different colors, e.g. that appear to have "jumps" in color when rendered in order and viewed with the human eye. This may lead to image artifacts when rendered, e.g. output color states with discontinuities in color appearance may be positioned by the halftone matrix as if they are continuous shades of color and thus result in discontinuities in rendered halftone patterns (e.g. a non-continuous tone printed output). Comparatively, lightness clusters, and then a colorant composition ordering, results in consecutive patterns of values in the halftone matrix being applied to output color states that share a continuity of visual appearance (e.g. that appear to be shades of a common color).

For example, a halftone matrix may be configured to have a level of continuity between consecutive threshold values, e.g. the halftone matrix may be configured such that there are few large spatial discontinuities between the placement of threshold values of 85 and the placement of threshold values 86 to 94. When output color states are sampled, e.g. using a cumulative distribution, the halftone matrix may be "sliced", e.g. different ranges of halftone threshold values result in different output color states (as was seen earlier a range of 80-90 when threshold values are between 0 and 100 may result in a first output color state, wherein a range of 90-100 may result in a second output color state). If consecutive output color states for these ranges differ in appearance then there may be a mismatch between the level of continuity in the halftone matrix values and a level of discontinuity in output color state appearance. However, halftone matrices are often also designed to weight the importance of early and later output color states in the ordering. The present examples reduce the risk of this occurring by minimizing the level of discontinuity in output color state appearance, while still maintaining an overall lightness gradient across the output color states (e.g. a lightness value progressively decreases as the order is traversed). As discussed previously, these effects are more likely to occur as the number of output color states increase, so the present examples are particularly useful for modern printing systems with a high number of possible output color states.

In certain cases, clustering may comprise dynamically generating groups of output color states during a pass through the set of output color states that are renderable by the color rendering device. For example, a first output color state for an order may be selected based on a color measurement value (e.g. as the output color state that is the lightest based on an L* value), and then a group of candidate output color states may be selected that are within a predefined color measurement value range (e.g. that are less than the current L* value for the selected output color state plus a predefined threshold). This group of candidate output color states, together with the selected output color state, may be considered a cluster. Within the group of candidate output color states, a next output color state in the order may be selected based on colorant composition (e.g. based on a score for each output color state in the group, the score being a distance metric between colorant drop vectors for the selected output color state and a given output color state in the group). The process may then be repeated to compute a chain of output color states that provides the order for halftoning, wherein the order may include transitions between output color states with non-monotonic color measurement values. This may be considered a form of connected-component processing. For example, in the orders described herein, a lightness value may decrease between certain pairs of output color states in the order (e.g. a next output color state may be lighter than a previous output color state); in comparative approaches with lightness ordering, the lightness values will increase through the order (e.g. comparative approaches may provide a monotonic lightness ordering where a next output color state is darker than a previous output color state).

Figure 4:
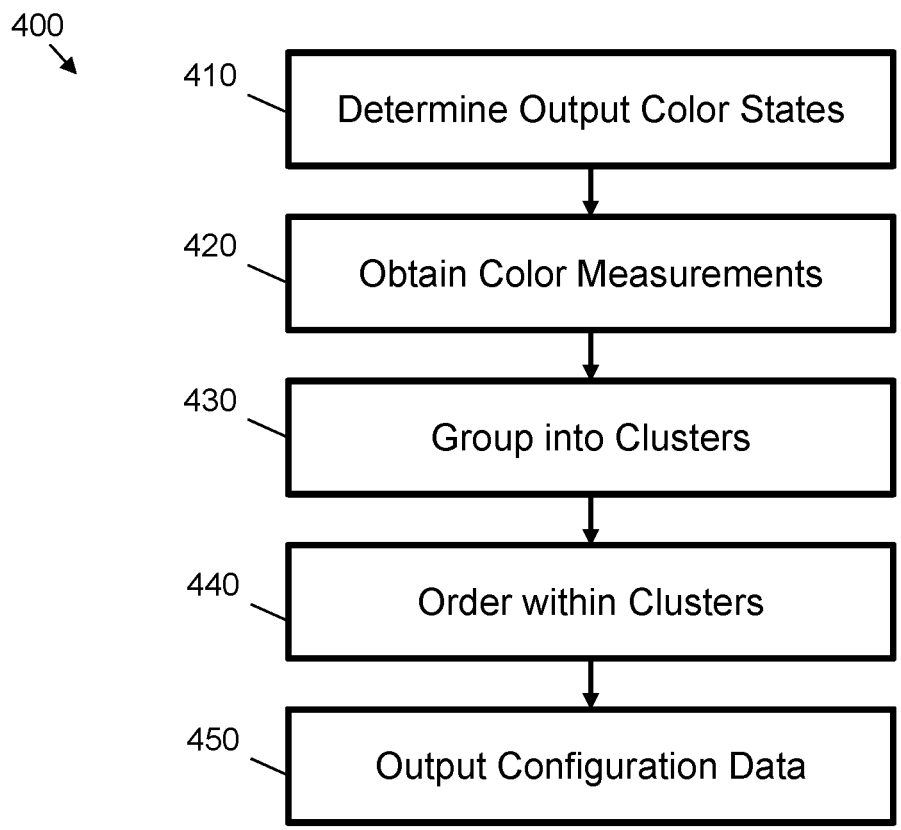
FIG. 4 is a flow diagram showing a method of generating configuration data for a color rendering device according to an example.

FIG. 4 shows a method 400 of configuring a halftoning operation for a color rendering device according to an example. The method 400 may be used to generate, for example, at least the configuration data 160 shown in FIG. 1.

At block 410, a set of output color states are determined. The output color states are states that are renderable by the color rendering device using a set of colorants. In one case, the output color states may be NPs. In one case, the available output color states may depend on a particular configuration of the color rendering device, e.g. may depend on which ink cartridges are installed or whether a print medium has a particular limit for an amount of ink that may be deposited in a unit area. A color rendering device such as 240 may output the set of currently available output color states, e.g. in response to an application programming interface call or the like. In one case, the set of output color states may be determined by processing data indicative of a color mapping, e.g. in the form of a look-up table and/or color profile, that maps a first input color space to a color space that uses probability values associated with the output color states (e.g. a mapping to NPacs).

At block 420, color measurements are obtained for the set of output color states. This may be performed by rendering test patches for the set of output color states determined in block 410. A test patch may comprise an area to be printed at a maximum probability or area coverage value (e.g. 100%) onto a predefined blank media (e.g. onto the media that sets a W or blank substrate color output state). Color measurements may then be made from the rendered test patches. Measurement may be made using, for example, a spectrophotometer or a colorimeter. Measurements may be made within a controlled factory environment (e.g. on a reference color rendering device for a particular line of color rendering devices) and/or may be made with respect to a particular color rendering device, e.g. during configuration of a color rendering device following installation at a particular location. The color measurements may comprise lightness measurements, and/or lightness values may be derived from the color measurements. For example, L* values may be measured directly or computed from measured color data. One result of block 420 may be a set of defined output color states and their measured colorimetries. Measured colorimetries in this case may comprise sets of corresponding XYZ or L*a*b* values (e.g. where each value is a three-dimensional or three-channel reading).

At block 430, the set of output color states (e.g. from block 410) is grouped into clusters based on the color measurements (e.g. from block 420). In one case, a first stage at block 430 is to order the output color states based on color property values within the measured color data. For example, the output color states may be ordered by lightness value, from lightest to darkest. In other cases, a first ordering by the color measurements may be performed as part of the grouping itself, e.g. may result from a grouping function applied to the color measurements. In one case, clustering may be performed by applying a clustering function to the color measurements. The clustering function may implement, for example, one or more of hierarchical (or connectivity-based) clustering, centroid-based clustering (e.g. k-means clustering), distribution-based clustering (e.g. Gaussian mixture models) and density-based clustering (such as DBSCAN—Density-Based Spatial Clustering of Applications with Noise). In one case, clustering may comprise grouping a lightness-ordered set of color measurement values by bins of lightness, e.g. all output color states that are within a particular range of lightness values are grouped together. Other histogram-based grouping may also be used. Clustering may be configured such that a darkest output color state in one cluster is at most d units away from a lightest output color state of a subsequent cluster (where the units depend on a distance measure or color measurement). The result of block 430 may comprise a set of output color state groups, where output color states within each group are ordered based on lightness.

At block 440, an order for output color states is determined within the clusters based on colorant composition. For example, this may comprise, for each cluster in turn, re-ordering output color states with consecutive measured color data values such that output color states with common colorants are consecutively ordered. In one case, for each cluster, output color states may be ordered based on which colorants (e.g. inks or other colored printing fluids) they use. This may result in ink-dominant output color states being ordered together within a cluster; e.g. output color states "c" and "cc"—one or two drops of light Cyan—may be consecutively ordered even if there is another output color state that has a lightness value that falls between the lightness values for these output color states. This is, for example, demonstrated in FIG. 3B (e.g. as compared with FIG. 3A). The result of block 440 may comprise a revised order of output color states, that is based upon a within cluster, colorant composition order.

At block 450, configuration data is output for the halftoning operation, the configuration data being indicative of the order resulting from block 440. For example, in one case, a header of a color profile data file containing a color mapping look-up-table may populated with the revised order output at block 440. The configuration data output at block 450 may be used as configuration data 160 in FIG. 1. The configuration data generated by the method 400 may be used for the particular color rendering device that printed test patches at block 420 and/or may be distributed (e.g. transmitted or installed within) a particular type or line of color rendering devices (e.g. in memory on manufactured devices before shipping). In one case, method 400 may be performed to generate default or factory settings that are loaded into color rendering devices during manufacture (e.g. loaded into an onboard memory of a printer), and then may also be repeated at a later point on a particular color rendering device, e.g. as part of a post installation configuration or as part of a regular calibration routine. In one case, the method 400 may be performed periodically with relation to a factory color rendering device to generate configuration data that is distributed (e.g. via the Internet) to networked color processing apparatus for use with specific installed color rendering devices.

In one case, determining an order for output color states comprises computing an ink composition metric by applying weights to values assigned to component inks of each output color state and ordering the output color states within each cluster based on the ink composition metric. For example, matching first-listed inks (such as "c" in "cYYYY" and "m" in "mmN") may have larger weights than subsequent listed inks (and so on) such that the ink composition metric results in a value that is useable to order the output color states by ink composition. In one case, the function to compute the ink composition metric may be configured to control a colorant composition order within each cluster, e.g. a parameter of such a function may control the number of drops of ink at which, instead of the next ink-consistent output color state, an output color state with a different ink is selected (e.g. such that "cC" may be followed by "C" rather than "cYY"). The control of the colorant composition order may allow for fine-tuning of output color state ordering, e.g. to reflect appearance to the human eye. For example, different weightings may be applied to different inks such that certain transitions are more likely than others.

In one case, an ink composition metric may comprise a score for pairs of output color states in a cluster, the score being a distance metric between colorant drop vectors for a first output color state and a second output color state in the cluster. In this case, a colorant drop vector may comprise a vector with elements for each available colorant (e.g. four elements in a CMYK case), where each element has a value based on an amount of colorant that is to be deposited. For example, in a case of CMYK system, an NP of CM may have a vector of [1, 1, 0, 0], and an NP of CMM may have a vector value of [1, 2, 0, 0], where the latter uses two drops of Magenta. These colorant drop vectors may be weighted by a constant scaling factor, e.g. to normalize the vectors and take into account different total ink drop amounts between output color states. A distance metric between two vectors associated with each pair of output color states in the group may then be computed, and the next output color state selected based on the computed distance metric values (e.g. a pair with the lowest distance metric may be selected with a current output color state in the order and a prospective next output color state, the prospective next output color state then being confirmed as the next output color state for the order). In one case, the distance metric may be based on a summed difference between elements of the vectors.

In certain cases, the method 400 may be followed by additional blocks that apply a halftone matrix based on the order within the configuration data, e.g. as explained with reference to FIGS. 1 and/or 2.

Figure 5:
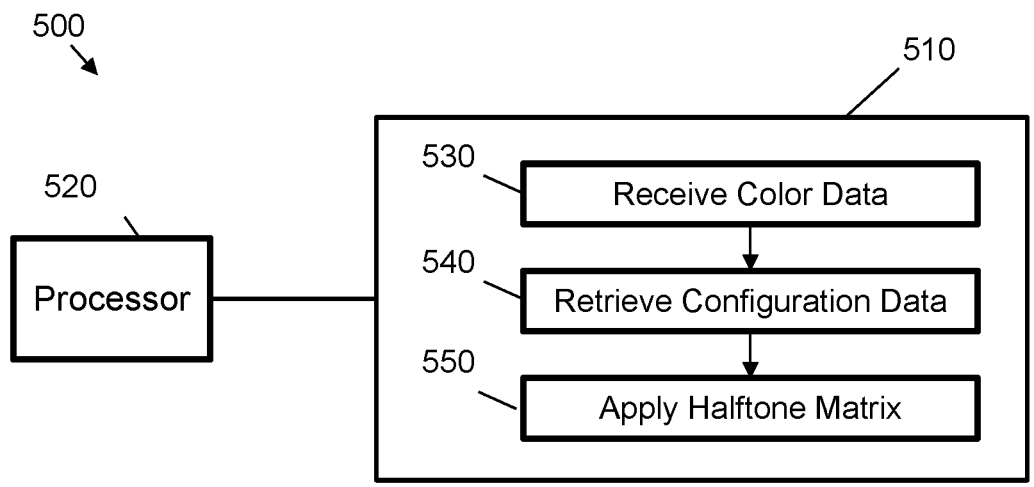
FIG. 5 is a schematic illustration showing a non-transitory computer-readable storage medium according to an example.

FIG. 5 shows an example 500 of a non-transitory computer-readable storage medium 510 storing instructions that, when executed by a processor 520, cause the processor 520 to perform a series of operations. In one case, the processor 520 and storage medium 510 may form part of a color processing apparatus such as 100, e.g. relate to the at least one processor 110 and the storage media 120. In other cases, the processor 520 and storage medium 510 may form part of a different device. In certain cases, the example 500 may be implemented as part of a print controller on a multi-dimensional printer, or as part of a print server, e.g. that processes received print jobs for printing. In certain cases, the example 500 may form part of a color processing pipelines, similar to that shown in FIG. 2.

Turning to FIG. 5, via instruction 530, the processor 520 is instructed to receive color data for an image to be rendered by a color rendering device. The color data indicates probability values for output color states for input image areas corresponding to portions of a rendered output. For example, the color data may comprise a series of NPac vector values for a set of pixels to be printed. The output color states are renderable by the color rendering device using a set of colorants, e.g. may comprise NPs as described above. Via instruction 540, the processor 520 is instructed to retrieve configuration data indicating an order of output color states for application of a halftone matrix. This configuration data may comprise the configuration data 160 shown in FIG. 1, and/or the configuration data output at block 450 by the method 400. In the present example, the output color states are grouped in clusters based on measured color properties associated with the color rendering device, wherein the order within the clusters is based on colorant composition. Via instruction 550, the processor 520 is instructed to apply a halftone matrix to the color data to generate render data for the color rendering device. The halftone matrix may be derived from the halftone data 140, as shown in FIG. 1. Similarly, at least the present instruction may form part of halftone instructions 150 in FIG. 1. The instruction 550 includes instructions to, for a given portion of the rendered output, select an output color state for the given portion by sampling the color data using the order indicated in the configuration data, wherein values of the halftone matrix correspond to thresholds for the sampling.

In one case, the method 400 of FIG. 4 may be implemented prior to the execution of instructions 530 to 550. In certain cases, the method 400 may be implemented as part of instructions stored in storage medium 510. In other cases, the method may be implemented as part of instructions stored in a separate device. In certain cases, the instructions 530 to 550 may be performed as blocks in a method that follows block 450 of FIG. 4.

In certain examples, the instructions cause the processor to perform a number of operations prior to receiving the color data. For example, the processor may be configured to receive image data for the image, and map the image data to the color data using a color mapping. The image data may indicate color values in a first color space for pixels of the image and the color mapping may convert color values in the first color space to color values in a second color space, wherein the second color space uses an area coverage representation. For example, a color mapping may be use a look-up table that maps sRGB space to NPac space. In one case, the configuration data is provided as part of the color mapping.

In one example, the instructions cause the processor to, in order to apply the halftone matrix, compare the values of the halftone matrix in parallel to ranges of values derived from the probability values for the output color states in the color data that are associated with print-resolution pixels, wherein an output color state is selected for each print-resolution pixel based on the comparison. For example, the instructions may apply PARAWACS in a HANS printing pipeline based on an order read from the configuration data. The values of the halftone matrix may be defined based on a set of predefined spatial distribution constraints. For example, a halftone matrix may be seen as "layers" or "slices" of threshold values. These layers may relate to a single threshold value or groups of threshold values. When selecting output color states, a group of threshold values may correspond to a particular range of cumulative probability values. For example, if a halftone matrix has M different values (e.g. an 8-bit matrix may have 256 values—0 to 255), then a probability value of 50% for a given output color state would result in M/2 (e.g. 128 for an 8-bit matrix) of the threshold values being associated with the output color state as part of the sampling. This set of threshold values (in a simple case, e.g. 0 to 127) may be referred to as a particular matrix "slice". The present examples help to ensure that consecutive "slices" of the halftone matrix are applied for consecutive colorant-compositions, while retaining a general application of the halftone matrix in lightness order.

Certain examples described herein produce improved halftone output, e.g. deposit instructions for discrete quantities of k available inks (or k ink channels), that has better image quality and better grain performance (e.g. printed images appear less "grainy" to the human eye). The examples address a fact that selection of output color states is over-constrained and complex. In certain examples, by ordering by color property and colorant composition, an application of threshold value patterns per ink may be controlled, which boosts image quality. Output color states, such as NPs within NPac vectors, may be ordered by both lightness, e.g. into lightness clusters of a given size, and the inks that are used within each output color state (e.g. within each NP), so that same-ink color states have a consecutive ordering within the lightness clusters. For printing pipelines with a large number of output color states, e.g. many different inks or different ink amounts, the described examples reduce the slicing of a halftone matrix into non-consecutive slices, e.g. for output color states using common inks.

At least some aspects of the examples described herein with reference to the drawings may be implemented using computer processes operating in processing systems or processors, e.g. as described with reference to FIGS. 1 and 5. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes described herein. The carrier may be any entity or device capable of carrying the program. For example, the carrier may comprise a storage medium, such as a solid-state drive (SSD) or other semiconductor-based RAM; a ROM, for example a compact disc (CD) ROM or a semiconductor ROM; a magnetic recording medium, for example a floppy disk or hard disk; optical memory devices in general; etc.

Similarly, it will be understood that a processor may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other printer control circuitry. The processor may be an embedded processor of a rendering device such as a printer or monitor.

The preceding description has been presented only to illustrate and describe examples of the principles described. This description is not intended to be exhaustive or to limit these principles to any precise form disclosed. For example, references to colorants and inks also apply to any colored printing fluid, or mechanism for rendering color by a device. Features of individual examples may be combined in different configurations, including those not explicitly set out herein. Many modifications and variations are possible in light of the above teaching.

What is claimed is:

1. A color processing apparatus comprising:
a processor; and
storage media, communicatively coupled to the processor, on which is stored computer-readable instructions that when executed by the processor, cause the processor to:
determine a set of output color states that are renderable by a color rendering device using a set of colorants;
obtain color measurements for the set of output color states;
group the set of output color states into clusters based on the color measurements;
determine an order for output color states within the clusters based on colorant composition; and
output render data for a halftoning operation indicative of the order.

2. The apparatus of claim 1, wherein the clusters are defined based on measured lightness values of the output color states.

3. The apparatus of claim 1, wherein the apparatus is a multi-dimensional color printer.

4. The apparatus of claim 1, further comprising:
an interface to communicate the render data to the color rendering device, the render data comprising color state instructions, the color state instructions indicating output color states for portions of a rendered output, wherein the storage media is to store:
halftone data defining a halftone matrix;
computer program code to instruct the processor to halftone color data for the rendered output using the halftone matrix and to output the render data, the color data indicating probability values for the output color states for input image areas corresponding to the portions of the rendered output; and
configuration data defining an order of output color states within clusters of the output color states for application of the halftone matrix, the output color states being grouped within the data based on the clusters of the output color states, the clusters being defined based on color properties of a rendered output generated by the color rendering device, the order of the output color states within the clusters being based on colorant composition.

5. The apparatus of claim 4, wherein the output color states comprise Neugebauer Primaries and the color comprises Neugebauer Primary area coverage (NPac) vectors for the input image areas.

6. The apparatus of claim 4, wherein the halftone matrix comprises threshold values and the computer program code is to instruct the processor to generate sampling data indicative of a cumulative probability distribution from vectors of the color data with the output color states arranged in the order indicated by the configuration data, wherein the computer program code is to halftone the color data by selecting an output color state based on a comparison of a threshold value from the halftone matrix and ordered elements of the cumulative probability distribution.

7. A method of configuring a halftoning operation for a color rendering device, comprising:
determining a set of output color states that are renderable by the color rendering device using a set of colorants;
obtaining color measurements for the set of output color states;
grouping the set of output color states into clusters based on the color measurements;
determining an order for output color states within the clusters based on colorant composition; and
outputting configuration data for the halftoning operation indicative of the order.

8. The method of claim 7, wherein the output color states comprise Neugebauer Primaries and the obtained color measurements comprises measured lightness values.

9. The method of claim 7, wherein determining the order for the output color states within the clusters comprises:
ordering the output color states based on color property values within the color measurements; and
re-ordering the output color states with consecutive measured color data values such that output color states with common colorants are consecutively ordered.

10. The method of claim 7, wherein obtaining the color measurements comprises:
printing a test patch for each of the set of output color states; and
measuring colorimetry values for each test patch.

11. The method of claim 7, wherein determining the order for the output color states comprises:
computing an ink composition metric by applying weights to values assigned to component inks of each output color state; and
ordering the output color states within each cluster based on the ink composition metric.

12. A non-transitory computer-readable storage medium storing instructions that, when executed by a processor, cause the processor to:
receive color data for an image to be rendered by a color rendering device, the color data indicating probability values for output color states for input image areas corresponding to portions of a rendered output, the output color states being renderable by the color rendering device using a set of colorants;
retrieve configuration data indicating an order of the output color states for application of a halftone matrix, the output color states being grouped in clusters based on measured color properties associated with the color rendering device, the order of the output color states within the clusters being based on colorant composition; and
apply the halftone matrix to the color data to generate render data for the color rendering device, including, for a given portion of the rendered output, to select an output color state for the given portion by sampling the color data using the order indicated in the configuration data, wherein values of the halftone matrix correspond to thresholds for the sampling.

13. The medium of claim 12, wherein the instructions cause the processor to, prior to receiving color data:
receive image data for the image, the image data indicating color values in a first color space for pixels of the image; and
map the image data to the color data using a color mapping, a color mapping based on the mapped image data converting color values in the first color space to color values in a second color space, wherein the second color space uses an area coverage representation.

14. The medium of claim 13, wherein the configuration data is provided as part of the color mapping.

15. The medium of claim 12, wherein the instructions cause the processor to, in order to apply the halftone matrix, compare the values of the halftone matrix in parallel to ranges of values derived from probability values for the output color states in the color data that are associated with print-resolution pixels, wherein an output color state is selected for each print-resolution pixel based on the comparison.

16. The medium of claim 12, wherein the values of the halftone matrix are defined based on a set of predefined spatial distribution constraints.

* * * * *